(12) United States Patent
Lee et al.

(10) Patent No.: US 11,036,665 B2
(45) Date of Patent: Jun. 15, 2021

(54) ELECTRONIC SYSTEM CAPABLE OF DETECTING NUMBER OF HOT PLUG INSERTION AND EXTRACTION CYCLES

(71) Applicant: Wistron Corporation, New Taipei (TW)

(72) Inventors: Syu-Siang Lee, New Taipei (TW); Yin-Hsin Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/150,271

(22) Filed: Oct. 3, 2018

(65) Prior Publication Data
US 2019/0391948 A1 Dec. 26, 2019

(30) Foreign Application Priority Data
Jun. 25, 2018 (TW) .................. 107121755

(51) Int. Cl.
*G06F 1/16* (2006.01)
*G06F 13/40* (2006.01)
(Continued)

(52) U.S. Cl.
CPC .......... *G06F 13/4081* (2013.01); *G06F 9/542* (2013.01); *G06F 11/3041* (2013.01); *G06F 11/3058* (2013.01)

(58) Field of Classification Search
CPC .. G06F 13/4081; G06F 9/542; G06F 11/3041; G06F 11/3058
(Continued)

(56) References Cited

U.S. PATENT DOCUMENTS 6,269,416 B1 * 7/2001 Meier ..................... G06F 1/263
710/301
6,338,107 B1 * 1/2002 Neal ................... G06F 13/4018
710/302
(Continued)

FOREIGN PATENT DOCUMENTS

CN 2862176 1/2007

OTHER PUBLICATIONS

"Office Action of China Counterpart Application", dated Aug. 19, 2020, p. 1-p. 11.

*Primary Examiner* — David R Lazaro
*Assistant Examiner* — Berhanu Shitayewoldetadik
(74) *Attorney, Agent, or Firm* — JCIPRNET

(57) ABSTRACT

An electronic system capable of detecting a number of hot-plug insertion/extraction cycles including a host device, at least one peripheral device, and at least one storage device is provided. The host device includes a controller and at least one connection socket. The controller has at least one detection pin. Each connection socket is coupled to a corresponding detection pin. The peripheral device includes at least one connector. The connector is hot-pluggably and electrically connected to the connection socket of the host device. The storage device stores the number of hot-plug insertion/extraction cycles of the connector in the peripheral device. When the connector of the peripheral device is connected to the connection socket of the host device, the controller reads the number of hot-plug insertion/extraction cycles from the storage device and increases the number of hot-plug insertion/extraction cycles of the connector in the peripheral device.

7 Claims, 1 Drawing Sheet

(51) Int. Cl.
    *G06F 11/30*     (2006.01)
    *G06F 9/54*     (2006.01)
    *G06F 9/445*     (2018.01)
    *H04L 15/16*     (2006.01)
    *H01R 12/70*     (2011.01)
    *H01R 12/72*     (2011.01)

(58) Field of Classification Search
    USPC .......................................................... 709/224
    See application file for complete search history.

(56) References Cited

U.S. PATENT DOCUMENTS

| | | | | |
|---|---|---|---|---|
| 6,363,452 | B1* | 3/2002 | Lach | G06F 13/4081 710/302 |
| 7,106,843 | B1* | 9/2006 | Gainsboro | H04M 3/2281 379/191 |
| 10,437,751 | B1* | 10/2019 | Norden | G06F 13/1689 |
| 10,459,171 | B2* | 10/2019 | Kurashima | G02B 6/3897 |
| 2001/0027517 | A1* | 10/2001 | Kato | G06F 8/65 713/1 |
| 2002/0032837 | A1* | 3/2002 | Larson | G06F 11/1076 711/115 |
| 2003/0172218 | A1* | 9/2003 | Scott | G06F 13/42 710/303 |
| 2004/0073819 | A1* | 4/2004 | Sekine | G06F 1/3215 713/300 |
| 2004/0177202 | A1* | 9/2004 | Won | G06F 13/4081 710/302 |
| 2005/0066073 | A1* | 3/2005 | Jacobs | G06F 13/423 710/15 |
| 2006/0004930 | A1* | 1/2006 | Patino | G06F 13/4081 710/16 |
| 2006/0097842 | A1* | 5/2006 | Gielis | G05B 9/03 340/3.1 |
| 2006/0224821 | A1* | 10/2006 | Chen | G06F 8/654 711/103 |
| 2007/0005997 | A1* | 1/2007 | Kardach | G06F 1/3203 713/300 |
| 2007/0271404 | A1* | 11/2007 | Dearth | G06F 13/102 710/302 |
| 2007/0283071 | A1* | 12/2007 | Konishi | G06F 13/4081 710/302 |
| 2008/0046624 | A1* | 2/2008 | Rubin | G06F 13/4072 710/302 |
| 2009/0185763 | A1* | 7/2009 | Park | H04W 4/21 382/311 |
| 2010/0035461 | A1* | 2/2010 | Berke | H01R 13/641 439/489 |
| 2011/0040922 | A1* | 2/2011 | Dearman | G06F 13/4081 710/316 |
| 2012/0250887 | A1* | 10/2012 | King | H03G 3/3005 381/104 |
| 2013/0205822 | A1* | 8/2013 | Heiland | F25D 31/00 62/259.2 |
| 2014/0181585 | A1* | 6/2014 | Hoang | G06F 11/3034 714/26 |
| 2014/0313419 | A1* | 10/2014 | Kim | H04N 21/4131 348/734 |
| 2014/0313420 | A1* | 10/2014 | Kim | H04N 21/44227 348/734 |
| 2015/0220139 | A1* | 8/2015 | Puthillathe | G06F 13/385 713/323 |
| 2016/0028404 | A1* | 1/2016 | Berke | G06F 21/85 377/94 |
| 2016/0147527 | A1* | 5/2016 | Lo | G06F 8/654 717/173 |
| 2016/0196194 | A1* | 7/2016 | Shih | G06F 11/3027 714/43 |
| 2016/0294087 | A1* | 10/2016 | Norton | H01R 12/721 |
| 2017/0242686 | A1* | 8/2017 | Vidyadhara | G06F 8/656 |
| 2017/0286349 | A1* | 10/2017 | Edirisooriya | G06F 13/4081 |
| 2018/0173664 | A1* | 6/2018 | Am | G06F 13/24 |
| 2018/0267836 | A1* | 9/2018 | Olarig | G06F 9/5027 |
| 2018/0341308 | A1* | 11/2018 | Chen | G06F 1/3296 |
| 2019/0146571 | A1* | 5/2019 | Yang | G06F 1/28 713/340 |
| 2019/0294777 | A1* | 9/2019 | Cobo | G06F 21/34 |

* cited by examiner

ELECTRONIC SYSTEM CAPABLE OF DETECTING NUMBER OF HOT PLUG INSERTION AND EXTRACTION CYCLES

CROSS-REFERENCE TO RELATED APPLICATION

This application claims the priority benefit of Taiwan application serial no. 107121755, filed on Jun. 25, 2018. The entirety of the above-mentioned patent application is hereby incorporated by reference herein and made a part of this specification.

BACKGROUND

Field of the Invention

The invention is directed to a hardware detection technique and more particularly, to an electronic system for recording the number of plug insertion/extraction cycles of a connector and/or a connection socket.

Description of Related Art

In the current technology, peripheral devices of most computation equipment support a hot swapping function. That is, a peripheral device supporting the hot swapping function can be plugged into a computation equipment or removed from the computation equipment without turning off the power of the computation equipment. There are a variety of hardware transmission protocols supporting such function, for example, an ExpressCard protocol, a peripheral component interconnect express (PCIe) protocol, a universal sequence bus (USB) protocol or a serial advanced technology attachment (SATA) protocol and so on.

In order to meet special demands, a peripheral device may probably be hot-swapped frequently. Generally, the number of hot-plug insertion/extraction cycles of a connector of the peripheral device is restricted, so as to prevent the connector from being worn and becoming nonfunctional due to multiple swapping. The number of hot-plug insertion/extraction cycles of the connector is restricted by physical properties and may affect its characteristics, such as the volume, wear of metal terminals and electron conduction, while lifetimes (the numbers of hot-plug insertion/extraction cycles) of connectors produced by each manufacturer vary with difference in quality, processes and materials. However, the currently available peripheral devices and the connectors thereof are usually incapable of recording and accessing the numbers of hot-plug insertion/extraction cycles, and as a result, stability and reliability with respect to the hot swapping function of the peripheral devices are unknown.

SUMMARY

The invention provides an electronic system capable of detecting the number of hot-plug insertion/extraction cycles, which can record and access the number of hot-plug insertion/extraction cycles of a connector in a peripheral device, such that maintenance staff of the electronic system can determine lifetimes and stability of the peripheral device and the electronic system according to the number of hot-plug insertion/extraction cycles of the connector.

An electronic system capable of detecting a number of hot-plug insertion/extraction cycles including a host device, at least one peripheral device, and at least one storage device is provided in the invention. The host device includes a controller and at least one connection socket. The controller has at least one detection pin. Each connection socket is coupled to a corresponding detection pin. The peripheral device includes at least one connector. The connector is hot-pluggably and electrically connected to the connection socket of the host device. The storage device stores the number of hot-plug insertion/extraction cycles of the connector in the peripheral device. When the controller uses the detection pin to acquire that the connector of the peripheral device is connected to the connection socket of the host device, the controller reads the number of hot-plug insertion/extraction cycles of the connector in the peripheral device from the storage device and increases the number of hot-plug insertion/extraction cycles.

To sum up, in the electronic system provided by the embodiments of the invention, the storage devices (e.g., EEPROM non-volatile memories) can be disposed in the connector of the peripheral device, the connection socket of the host device and/or the host device itself, the controller in the host device uses the storage devices to record and access the numbers of hot-plug insertion/extraction cycles of the connectors and/or the connection sockets. In other words, a degree of wear and a lifetime limit of each of the connectors and/or the connection sockets of the electronic system provided by the embodiments of the invention can be determined based on the number of hot-plug insertion/extraction cycles of the connectors and/or the connection sockets. In this way, the maintenance staff can be prompted by the electronic system to verify whether the lifetime limit of the connectors and/or the connection sockets is reached using the recorded number of hot-plug insertion/extraction cycles, the maintenance staff can determine whether to replace the connectors and/or the connection sockets according to the numbers of hot-plug insertion/extraction cycles of the connectors and/or the connection sockets, so as to increase the lifetime, stability and reliability of the overall electronic system.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
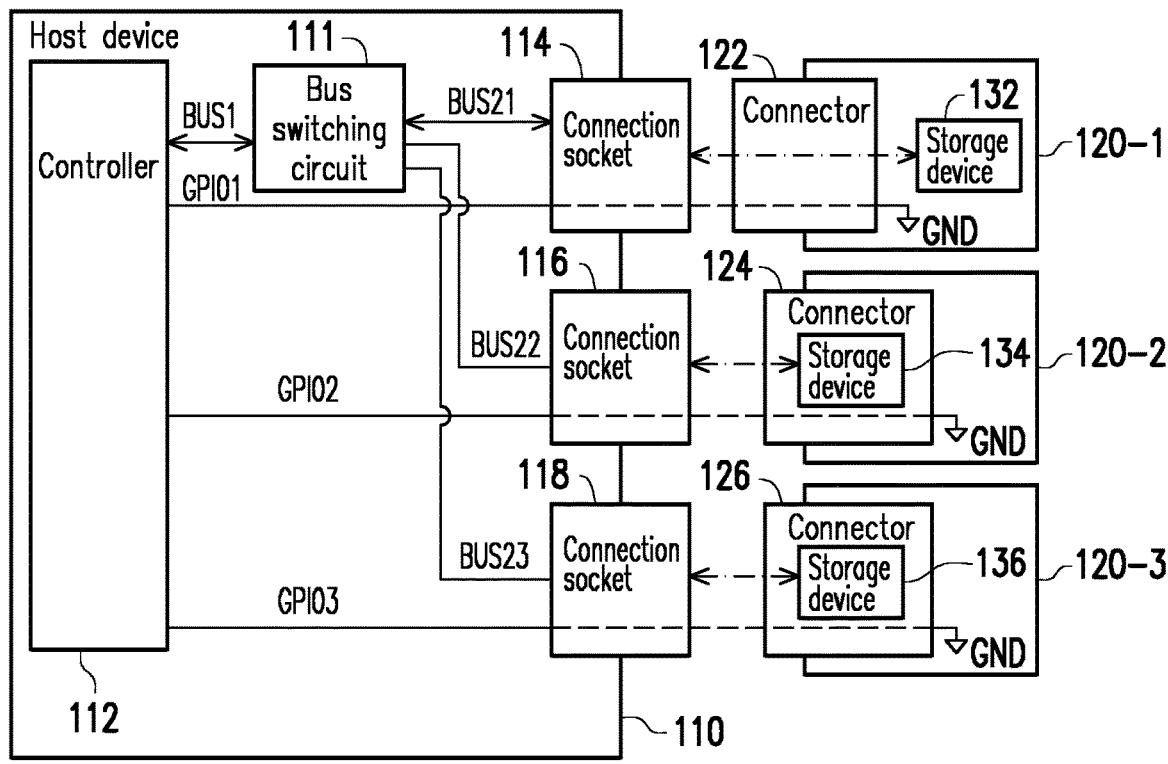
FIG. 1 is a schematic view of an electronic system according to a first embodiment of the invention.

FIG. 1 is a schematic view of an electronic system 100 according to a first embodiment of the invention. The electronic system 100 mainly includes a host device 110, at least one peripheral device (for example, peripheral devices 120-1, 120-2 and 120-3) and at least one storage device (for example, storage devices 132, 134 and 136). The host device 110 may be a personal computer, a mainframe server, a blade server and so on. The peripheral devices may adopt hardware in compliance with hot swapping, the hardware may use a customized or a user-compatible hardware transmission protocol related to a hot swapping function (for example, an ExpressCard protocol, a peripheral component interconnect express (PCIe) protocol, a universal sequence bus (USB) protocol or a serial advanced technology attachment (SATA) protocol. For example, the peripheral devices may be solid-state drives (SSDs), various add-on cards, such as independent display cards with graphics processors or adapter cards, thumb drives, replaceable fuses and so on. Those who apply the present embodiment can adjust the protocol as used and the technique applied thereon based on demands, which constitutes no limitation to the invention.

Figure 2:
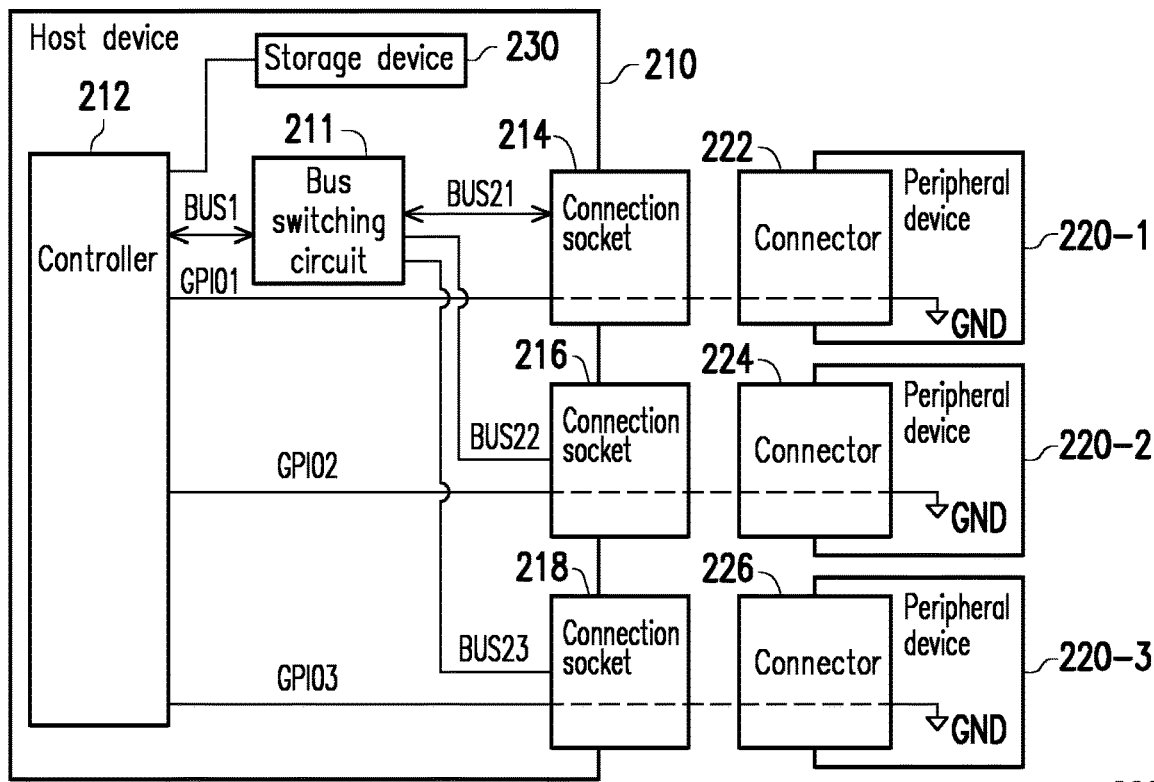
FIG. 2 is a schematic view of an electronic system according to a second embodiment of the invention.

It should be specifically mentioned that the application of the present embodiment is not limited to device application types for the electronic system, the host device and the peripheral devices, and the embodiments of the invention can be carried out as long as the host device has the connection sockets, and the peripheral devices have connectors corresponding to the connection sockets. In addition, those who apply the present embodiment can adjust disposition positions of the storage devices 132, 134 and 136 based on demands, as long as the storage devices 132, 134 and 136 are disposed in the electronic system 100 and are capable of communicating with a controller 112 in the host device 110. For example, the storage device 132 illustrated in FIG. 1 is disposed in the peripheral device 120-1, the storage devices 134 and 136 are respectively disposed in the connectors 124 and 126 of the peripheral devices 120-2 and 120-3, and the storage device 230 illustrated in FIG. 2 is disposed in the host device 210.

The host device 110 mainly includes the controller 112 and at least one connection socket (for example, connection sockets 114, 116 and 118). The controller 112 may be a baseboard management controller (BMC), a chipset or a control unit in the host device 110. The controller 112 has at least one detection pin (for example, detection pins GPIO1, GPIO2 and GPIO3). The detection pins of the present embodiment may be implemented by using general-purpose input/output (GPIO) pins. Each of the connection sockets 114, 116 and 118 is coupled to the corresponding detection pins GPIO1, GPIO2 and GPIO3. The peripheral devices 120-1 to 120-3 include the connectors 122, 124 and 126, respectively. The connectors 122, 124 and 126 are hot-pluggably and electrically connected with the connection sockets 114, 116 and 118 of the host device 110.

The controller 112 uses the detection pins GPIO1, GPIO2 and GPIO3 to acquire whether the connector 122, 124 or 126 of the peripheral device is connected to the connection socket 114, 116 or 118 of the host device 110. Those who apply the present embodiment may connect the pins in the connectors 122, 124 and 126 corresponding to the detection pins GPIO1, GPIO2 and GPIO3 to a specific voltage level (e.g., a ground voltage GND or a power supply voltage). The controller 112 may use potential levels of the detection pins GPIO1, GPIO2 and GPIO3 to acquire whether the peripheral devices 120-1 to 120-3 are securely connected. For example, the pins of the connectors 122, 124 and 126 of the peripheral devices 120-1 to 120-3 corresponding to the detection pins GPIO1, GPIO2 and GPIO3 may be connected to the ground voltage GND. When the detection pins GPIO1, GPIO2 and GPIO3 of the present embodiment are not connected to the connectors 122, 124 and 126 of the peripheral devices 120-1 to 120-3 (i.e., the detection pins GPIO1, GPIO2 and GPIO3 float), the detection pins GPIO1, GPIO2 and GPIO3 are in a first voltage level (e.g., a high voltage level). On the contrast, when the detection pins GPIO1, GPIO2 and GPIO3 of the present embodiment are electrically connected with the connectors 122, 124 and 126 of the peripheral devices 120-1 to 120-3, the detection pins GPIO1, GPIO2 and GPIO3, due to being connected to the ground voltage GND, are in a second voltage level (e.g., a low voltage level). In this way, the controller 112 may know whether the connector 122, 124 or 126 is electrically connected to the connection socket 114, 116 or 118 according to the change in the potential levels of the detection pins GPIO1, GPIO2 and GPIO3.

The host device 110 further includes a bus switching circuit 111. The bus switching circuit 111 is controlled by the controller 112. In the present embodiment, the bus switching circuit 111 and the controller 112 are connected with each other via a first bus BUS1, and the bus switching circuit 111 and each of the connection sockets 114, 116 and 118 are connected with each other via second buses BUS21, BUS22 and BUS23. The first bus BUS1 and the second buses BUS21, BUS22 and BUS23 are all used to communicate with the storage devices 132, 134 and/or 136 in the connected peripheral devices 120-1, 120-2 and/or 120-3 to read or write the number of hot-plug insertion/extraction cycles of the corresponding connectors 122, 124 and/or 126. The first bus BUS1 and the second buses BUS21, BUS22 and BUS23 of the present embodiment are implemented by using system management buses (SMBUS) or inter-integrated circuits (I2C), and those who apply the present embodiment can adjust the communications protocol type of the buses based on demands.

When the controller 112 uses one of the detection pins GPIO1, GPIO2 and GPIO3 to acquire that one of the connectors 122, 124 and 126 corresponding to the peripheral devices 120-1, 120-2 and 120-3 is connected to one of the connection sockets 114, 116 and 118 of the host device 110, the controller 112 reads the number of hot-plug insertion/extraction cycles of one of the connectors 122, 124 and 126 from one of the corresponding storage devices 132, 134 and 136 and increases the number hot-plug insertion/extraction cycles. In the present embodiment, the storage device 132 stores the number of hot-plug insertion/extraction cycles of the connector 122 in the peripheral device 120-1 with respect to any one of the connection sockets, the storage device 134 stores the number of hot-plug insertion/extraction cycles of the connector 124 in the peripheral device 120-2 with respect to any one of the connection sockets, and the storage device 136 stores the number of hot-plug insertion/extraction cycles of the connector 126 in the peripheral device 120-3 with respect to any one of the connection sockets.

An example is provided herein to describe the detailed operation in a scenario that the peripheral device 120-1 is plugged into the connection socket 114 of the host device 110. In a condition that the host device 110 is not electrically connected with the peripheral devices 120-1, 120-2 and 120-3, when the connector 122 of the peripheral device 120-1 is connected to the connection socket 114 of the host device 110, the controller 112 uses the bus switching circuit 111 to electrically connect the first bus BUS1 with the second bus BUS21, such that the controller 112 may control the storage device 132 in the peripheral device 120-1. Then, the controller 112 reads the number of hot-plug insertion/extraction cycles (e.g., a value of "014") of the connector 122 from the storage device 132, thereby obtaining the number of times that the connector 122 is electrically connected with the connection socket of the same type. Then, the controller 112 also increases the number of hot-plug insertion/extraction cycles (e.g., the value of "014") of the connector 122 by a unit (e.g., to be a value of "015") and stores the number of hot-plug insertion/extraction cycles back to the storage device 132. In this way, when the connector 122 is connected to the connection socket 114 the next time, the controller 112 may obtain the updated number of hot-plug insertion/extraction cycles (i.e., the value of "015"). When the peripheral devices 120-2 and 120-3 are plugged into the corresponding connection sockets 116 and 118 of the host device 110, the controller 112 also performs the aforementioned operation to obtain the numbers of hot-plug insertion/extraction cycles of the corresponding connectors 124 and 126 and stores the updated numbers of hot-plug insertion/extraction cycles back to the storage devices 134 and 136.

Regarding the peripheral device 120-1 of the present embodiment, the storage device 132 is disposed in the main body of the peripheral device 120-1, instead of being disposed on the connector 122. In this way, when the controller 112 detects that the number of hot-plug insertion/extraction cycles of the connector 122 in the peripheral device 120-1 exceeds a preset safety value, the controller 112 issues a warning message to prompt the maintenance staff of the electronic system 100 to replace the entire peripheral device 120-1. Or, alternatively, after acquiring the warning message, the maintenance staff may physically replace the connector 122 of the peripheral device 120-1. Then, when the peripheral device 120-1 is electrically connected with the host device 110, the maintenance staff, by using the controller 112, may clear the value stored in the storage device 132 or set the value to a specific value (e.g., a value of "1" is set to record the current number of hot-plug insertion/extraction cycles).

Regarding the peripheral devices 120-2 and 120-3 of the present embodiment, the storage devices 134 and 136 are disposed in the connectors 124 and 126, and the connectors 124 and 126 of the peripheral devices 120-2 to 120-3 may be physically replaced. In this way, when the controller 112 detects that the number of hot-plug insertion/extraction cycles of the connector 124 or 126 in the peripheral device 120-2 or 120-3 exceeds the preset safety value, the controller 112 issues a warning message to prompt the maintenance staff of the electronic system 100 to replace the connectors 124 or 126 of the peripheral devices 120-2 or 120-3. After the connectors 124 and 126 are replaced, the numbers of hot-plug insertion/extraction cycles stored in the storage devices 134 and 136 in the replaced connectors 124 and 126 are preset to "0".

The host device 110 is usually an uninterruptible power system (UPS), and thus, the peripheral devices 120-1 to 120-3 may be hot-plugged in or unplugged from the host device 110 in a condition that the host device 110 is powered on, such that the numbers of hot-plug insertion/extraction cycles of each of the connectors 122, 124 and 126 in the peripheral devices 120-1 to 120-3 may be correctly recorded in the corresponding storage devices 132, 134 and 136. In the consideration that the replacement of the peripheral devices 120-1 to 120-3 may be needed when the host device 110 is shut down for maintenance, thus, when the host device 110 is powered off and re-powered on, the controller 112, after acquiring that the connectors 122, 124 and/or 126 of the peripheral devices 120-1 to 120-3 are connected to the connection sockets 114, 116 and/or 118 of the host device 110, reads the number of hot-plug insertion/extraction cycles of each of the connectors 122, 124 and/or 126 in the peripheral devices 120-1 to 120-3 from the storage devices 132, 134 and/or 136 and increases the number of hot-plug insertion/extraction cycles (for example, by 1) and stores the number back to the storage devices 132, 134 and/or 136. In this way, the numbers of hot-plug insertion/extraction cycles of the connectors 122, 124 and/or 126 may be secured when the peripheral devices 120-1 to 120-3 are replaced after the host device 110 is powered off.

In FIG. 1, the storage devices 132, 134 and 136 are respectively disposed in the peripheral devices 120-1 to 120-3, but those who apply the present embodiment may also dispose the storage devices in the host device, as illustrated in FIG. 2. FIG. 2 is a schematic view of an electronic system 200 according to a second embodiment of the invention. The electronic system 200 includes a host device 210 and peripheral devices 220-1 to 220-3. In the present embodiment, the storage device 230 is disposed in the host device 210. In other words, the host device 210 further includes the storage device 230 in addition to a bus switching circuit 211, a controller 212 and connection sockets 214, 216 and 218. In this way, when connectors 222, 224 and/or 226 corresponding to the peripheral devices 220-1 to 220-3 are plugged into the connection sockets 214, 216 and/or 218, the controller 212 may use the storage device 230 to record the peripheral devices 220-1 to 220-3 and the numbers of hot-plug insertion/extraction cycles of the corresponding connectors 222, 224 and/or 226. To be detailed, the controller 212 may obtain identification codes of the connected peripheral devices 220-1 to 220-3 via the second buses BUS21, BUS22 and/or BUS23, read and inquire the number of hot-plug insertion/extraction cycles corresponding to each of the connectors 222, 224 and/or 226 from the storage device 230 according to the identification codes, increase the number of hot-plug insertion/extraction cycles by 1 and store the number back to the storage device 230, thereby recording and updating the number of hot-plug insertion/extraction cycles of each of the connectors.

The electronic system 200 illustrated in FIG. 2 may further use the controller 212 and the storage device 230 to record the number of hot-plug insertion/extraction cycles of the connection sockets 214, 216 and/or 218. The connection sockets 214, 216 and 218 also have product lifetimes, and the maintenance staff may also physically replace the connection sockets 214, 216 and 218 on the host device 210. Thus, when the peripheral devices 220-1 to 220-3 are electrically connected to the connection sockets 214, 216 and/or 218, the controller 212 uses the storage device 230 to read and inquire the number of hot-plug insertion/extraction cycles corresponding to each of the connection sockets 214, 216 and/or 218, increase the number of hot-plug insertion/extraction cycles by 1 and store the number back to the storage device 230, thereby recording and updating the number of hot-plug insertion/extraction cycles of each of the connection sockets 214, 216 and/or 218.

When the number of hot-plug insertion/extraction cycles of each of the connection sockets 214, 216 and/or 218 exceeds a preset safety value, the controller 212 may issue a warning message to the maintenance staff to replace the connection sockets 214, 216 and/or 218. After the connection sockets 214, 216 and/or 218 are replaced, the maintenance staff may use the controller 212 to clear the number of hot-plug insertion/extraction cycles corresponding to each of the connection sockets 214, 216 and/or 218 in the storage device 230.

In other embodiments in compliance with the invention, each connector and/or each connection socket in the host device may also include a storage device thereof, so as to record the number of hot-plug insertion/extraction cycles of each connector and/or each connection socket. In other embodiments in compliance with the invention, not only each connector and/or each connection socket in the host device may include the storage device thereof, but also the host device may be disposed with the storage device itself (or referred to as an internal memory). The internal memory may be a non-volatile memory (for example, an EEPROM or an SSD). In addition, the controller of the host device may use its storage device (the internal memory) to set up a database or table data related to the number of hot-plug insertion/extraction cycles of each peripheral device and each connection socket for maintenance staff's inquiry and review, thereby obtaining stability and reliability of each connector and each connection socket accurately.

Based on the above, in the electronic system provided by the embodiments of the invention, the storage devices (e.g., EEPROM non-volatile memories) can be disposed in the connectors of the peripheral devices, the connection sockets of the host device and/or the host device itself, the controller in the host device uses the storage devices to record and access the numbers of hot-plug insertion/extraction cycles of the connectors and/or the connection sockets. In other words, a degree of wear and a lifetime limit of each connector and/or each connection socket of the electronic system provided by the embodiments of the invention can be determined based on the number of hot-plug insertion/extraction cycles of the connector and/or the connection socket. In this way, the maintenance staff can be prompted to verify whether the lifetime limit of the connector and/or the connection socket is reached by the electronic system using the recorded number of hot-plug insertion/extraction cycles, the maintenance staff can determine whether to replace the connector and/or the connection socket according to the number of hot-plug insertion/extraction cycles of the connector and/or the connection socket, so as to increase the stability and reliability of the overall electronic system.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic system, comprising: a host device, comprising:
    a controller, having at least one detection pin;
    at least one connection socket, each connection socket being coupled to the corresponding detection pin; and
    merely one storage device; and
  at least one peripheral device, having a connector hot-pluggably and electrically connected to the connection socket of the host device,
  wherein the storage device is configured to store a number of hot-plug insertion/extraction cycles of the connector in the peripheral device,
  wherein the controller uses the detection pin to acquire that the connector of the peripheral device is connected to the connection socket of the host device,
  wherein the controller obtains an identification code from the connected peripheral device, the controller reads the number of hot-plug insertion/extraction cycles corresponding to the connected peripheral device according to the identification code from the storage device and increases the number of hot-plug insertion/extraction cycles of the connector in the peripheral device stored in the storage device of the host device to verify whether a life time of the connector or the connection socket is reached to increase stability and reliability of the electronic system.

2. The electronic system according to claim 1, wherein the storage device is disposed in the host device.

3. The electronic system according to claim 2, wherein the controller uses the storage device to record the peripheral device, the number of hot-plug insertion/extraction cycles of the corresponding connector and the number of hot-plug insertion/extraction cycles of the connection socket.

4. The electronic system according to claim 1, wherein when the detection pin floats, the detection pin is at a first voltage level, and when the detection pin is electrically connected with the connector of the peripheral device, the detection pin is at a second voltage level.

5. The electronic system according to claim 1, wherein when the controller acquires that the connector of the peripheral device is connected to the connection socket of the host device when the host device is powered on, the controller reads the number of hot-plug insertion/extraction cycles of the connector in the peripheral device from the storage device and increases the number of hot-plug insertion/extraction cycles.

6. The electronic system according to claim 1, wherein the controller detects whether the number of hot-plug insertion/extraction cycles of the connector in the peripheral device exceeds a preset safety value, and when the number of hot-plug insertion/extraction cycles exceeds the preset safety value, the controller sends a warning message.

7. The electronic system according to claim 1, wherein the controller is a baseboard management controller (BMC).

* * * * *